United States Patent
Takagi et al.

(10) Patent No.: US 9,222,552 B2
(45) Date of Patent: Dec. 29, 2015

(54) TRANSMISSION

(71) Applicant: AISIN SEIKI KABUSHIKI KAISHA, Kariya-shi (JP)

(72) Inventors: Kiyoharu Takagi, Okazaki (JP); Atsuhiro Mase, Chita-gun (JP); Hideki Nakamura, Nagoya (JP)

(73) Assignee: AISIN SEIKI KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/496,846

(22) Filed: Sep. 25, 2014

(65) Prior Publication Data
US 2015/0087470 A1    Mar. 26, 2015

(30) Foreign Application Priority Data

Sep. 25, 2013   (JP) .................................. 2013-197793

(51) Int. Cl.
*F16H 3/62* (2006.01)
*F16H 3/66* (2006.01)

(52) U.S. Cl.
CPC .......... *F16H 3/66* (2013.01); *F16H 2200/0069* (2013.01); *F16H 2200/0078* (2013.01); *F16H 2200/0086* (2013.01); *F16H 2200/2012* (2013.01); *F16H 2200/2046* (2013.01); *F16H 2200/2048* (2013.01)

(58) Field of Classification Search
None
See application file for complete search history.

(56) References Cited

U.S. PATENT DOCUMENTS

| 5,254,053 | A  | * | 10/1993 | Taniguchi et al. | ............ 475/276 |
| 7,131,926 | B2 |   | 11/2006 | Tiesler et al. | |
| 7,534,190 | B2 | * | 5/2009  | Tabata et al. | ...................... 477/3 |
| 7,828,688 | B2 |   | 11/2010 | Phillips et al. | |
| 8,070,646 | B2 | * | 12/2011 | Hart et al. | ..................... 475/280 |
| 8,152,667 | B2 | * | 4/2012  | Shibata et al. | ..................... 475/5 |
| 8,177,674 | B2 | * | 5/2012  | Baldwin | ........................ 475/275 |
| 8,393,995 | B2 | * | 3/2013  | Imamura et al. | .................. 477/3 |
| 2009/0011891 | A1 | | 1/2009 | Phillips et al. | |
| 2010/0216589 | A1 | | 8/2010 | Hart et al. | |

FOREIGN PATENT DOCUMENTS

WO    2015/011951 A1    1/2015

OTHER PUBLICATIONS

Extended European search report issued on Jul. 3, 2015, by the European Patent Office in corresponding European Patent Application No. 14184610.5-1752 (10 pages).

* cited by examiner

*Primary Examiner* — Dirk Wright
(74) *Attorney, Agent, or Firm* — Buchanan Ingersoll & Rooney PC

(57) ABSTRACT

A transmission includes a housing, four planetary mechanisms, four clutches, two brakes, plural connection members connecting elements of each of planetary mechanisms one another, an input shaft, and an output shaft. A first connection member at which the third clutch is positioned is positioned at an outer periphery side compared to a second connection member connecting a ring gear of the second planetary mechanism and a carrier of the third planetary mechanism. An installation surface to which a third brake braking a rotation of a connection part is addable and which is opposed to an inner periphery surface of the housing is formed at the connection part connecting the third clutch and a ring gear of the third planetary mechanism among the first connection member.

4 Claims, 7 Drawing Sheets

|  | C1 | C2 | C3 | C4 | B1 | B2 |
|---|---|---|---|---|---|---|
| Rev |  | ◯ | ◯ |  |  | ◯ |
| 1st | ◯ |  |  | ◯ |  | ◯ |
| 2nd | ◯ | ◯ |  |  |  | ◯ |
| 3rd | ◯ |  |  |  | ◯ | ◯ |
| 4th | ◯ |  | ◯ |  |  | ◯ |
| 5th | ◯ |  | ◯ |  | ◯ |  |
| 6th | ◯ | ◯ | ◯ |  |  |  |
| 7th |  | ◯ | ◯ |  | ◯ |  |
| 8th |  |  | ◯ | ◯ | ◯ |  |
| 9th |  | ◯ |  | ◯ | ◯ |  |
| 10th | ◯ |  |  | ◯ | ◯ |  |

FIG. 5

| 15th | 10th | C1 | C2 | C3 | C4 | B1 | B2 | B3 |
|---|---|---|---|---|---|---|---|---|
| Rev.2 |  |  | ◎ | ◎ |  |  |  | ◎ |
| Rev.1 | Rev |  | ○ | ○ |  |  | ○ |  |
| 1st | 1st | ○ |  |  | ○ |  | ○ |  |
| 2nd |  |  | ◎ |  | ◎ |  |  | ◎ |
| 3rd | 2nd | ○ | ○ |  |  |  | ○ |  |
| 4th |  |  | ◎ |  |  | ◎ |  |  | ◎ |
| 5th | 3rd | ○ |  |  |  | ○ | ○ |  |
| 6th |  |  | ◎ | ◎ |  |  |  |  | ◎ |
| 7th |  |  | ◎ |  |  |  | ◎ |  | ◎ |
| 8th | 4th | ○ |  | ○ |  |  | ○ |  |
| 9th |  |  | ◎ |  | ◎ |  |  |  | ◎ |
| 10th | 5th | ○ |  | ○ |  | ○ |  |  |
| 11th | 6th | ○ | ○ | ○ |  |  |  |  |
| 12th | 7th |  | ○ | ○ |  | ○ |  |  |
| 13th | 8th |  |  | ○ | ○ | ○ |  |  |
| 14th | 9th |  | ○ |  | ○ | ○ |  |  |
| 15th | 10th | ○ |  |  | ○ | ○ |  |  |

TRANSMISSION

CROSS REFERENCE TO RELATED APPLICATIONS

This application is based on and claims priority under 35 U.S.C. §119 to Japanese Patent Application 2013-197793, filed on Jul. 30, 2013, the entire contents of which are incorporated herein by reference.

TECHNICAL FIELD

The present invention relates to a transmission that enables to establish multiple speed stages by plural planetary mechanisms.

BACKGROUND TECHNOLOGY

A transmission is applied as an apparatus to change speeds of a rotational drive force that a motor such as an engine mounted to a vehicle outputs. As a transmission for a vehicle, for example, Patent reference 1 discloses a transmission that includes four planetary mechanisms rotatably supported about a rotation axis, four clutches selectively connecting predetermined elements at the planetary mechanisms, and two brakes braking rotations of predetermined elements at the planetary mechanisms. According to the layout of each member disclosed in Patent reference 1, by multiply operating three engaging elements among four clutches and two brakes, speed stages constructed with ten forward speeds and one rearward speed can be established.

The transmission including those plural planetary mechanisms and engaging elements is advantageous in terms of capable of obtaining multiple speed stages with a relatively small sized body structure because of features of the planetary mechanisms. On the other hand, according to those transmissions, the number of elements that should be connected from an input side to an output side is large, thus variety of layout patterns are applied. Accordingly, because respective layouts have different features, the optimum layout design is provided in terms of use of the transmission, required performance, and manufacturing costs, for example.

The transmission may be required to further increase the number of speed stages in accordance with changes in uses. In those circumstances, layouts of the transmission that can establish multiple speed stages exceeding ten forward speeds can be designed by increasing engagement patterns that are combinations of engaging elements in operation. However, considering diversions of parts, it is more favorable that the number of speed stages can be further increased only by adding engaging elements to an existing transmission than newly designing layouts.

Thereupon, it is postulated that the number of speed stages is further increased by increasing the number of brakes in Patent reference 1. In case of increasing the number of brakes, a connection member among connection members connecting elements between the elements serves as an object, the connection member where another member is not interposed between the connection member and a housing, the connection member which is always connected to one of the elements, and the connection member excluding the connection member that is provided to another brake. In that case, provided that a brake is added to a connection member (42) that connects a sun gear (14A) of a second planetary gear set and an end of a clutch (30) in FIG. 2 of Patent reference 1, an engagement pattern for braking the rotation of the sun gear via the connection member (42) can be added.

In the foregoing construction, three speed stages are added by an increase in the engagement pattern. However, provided that the maximum number of the engaging elements that are switched when transiting to an adjacent speed stage is defined as two, the number of the added speed stages is two. It is considered that this is caused because the layout designing according to Patent reference 1 is not conducted in terms of expandability foreseeing further increases in the number of speed stages of the transmission, and is conducted in terms of a predetermined required performance.

A purpose is to provide a transmission that can establish multiple speed stages with a layout that is different from conventional layouts and that can enhance expandability.

SUMMARY

A transmission disclosed here includes a housing; first, second, third and fourth planetary mechanisms rotatably supported by the housing to rotate about a rotation axis, the planetary mechanism including three elements, a sun gear, a ring gear, and a carrier; first, second, third and fourth clutches capable of selectively connecting the elements one another; a first brake braking a rotation of the sun gear of the first planetary mechanism; a second brake braking a rotation of the ring gear of the fourth planetary mechanism; a first connection member which serves as a connection member connecting the elements of the planetary mechanisms one another and to which the third clutch is positioned; a second connection member serving as a connection member connecting the elements of the planetary mechanisms one another, the second connection member connecting the ring gear of the second planetary mechanism and the carrier of the third planetary mechanism; an input shaft always connected to the carrier of the first planetary mechanism and rotatably supported by the housing to rotate about the rotation axis; an output shaft always connected to the carrier of the fourth planetary mechanism and rotatably supported by the housing to rotate about the rotation axis; wherein first, second, third and fourth positions are defined in an axial direction of the rotation axis from an input side where the input shaft is positioned towards an output side where the output shaft is positioned, the first planetary mechanism is positioned at one of the first position and the second position and the second planetary mechanism is positioned at the other of the first position and the second position, the third planetary mechanism is positioned at the third position, the fourth planetary mechanism is positioned at the fourth position; the ring gear of the first planetary mechanism is always connected to the sun gear of the third planetary mechanism and the sun gear of the fourth planetary mechanism; the ring gear of the second planetary mechanism is always connected to the carrier of the third planetary mechanism; the carrier of the third planetary mechanism is always connected to the ring gear of the fourth planetary mechanism; the first clutch is arranged at a position for selectively connecting the sun gear of the first planetary mechanism and the sun gear of the second planetary mechanism; the second clutch is arranged at a position for selectively connecting the carrier of the first planetary mechanism and the sun gear of the second planetary mechanism; the third clutch is arranged at a position for selectively connecting the carrier of the second planetary mechanism and ring gear of the third planetary mechanism; the fourth clutch is arranged at a position for selectively connecting the ring gear of the first planetary mechanism and the carrier of the second planetary mechanism; the first connection member is positioned at an outer periphery side compared to the second connection member; and an installation surface is formed at a connection part connecting the third clutch and the ring gear of the third planetary mechanism among the first connection member, the installation surface to which a third brake braking a rotation of the connection part is addable and which is opposed to an inner periphery surface of the housing.

BRIEF DESCRIPTION OF DRAWINGS

FIG. 5 is a table for engagement showing operation states of clutches and brakes at each of speed stages.

DETAILED DESCRIPTION

Figures 1, 2:
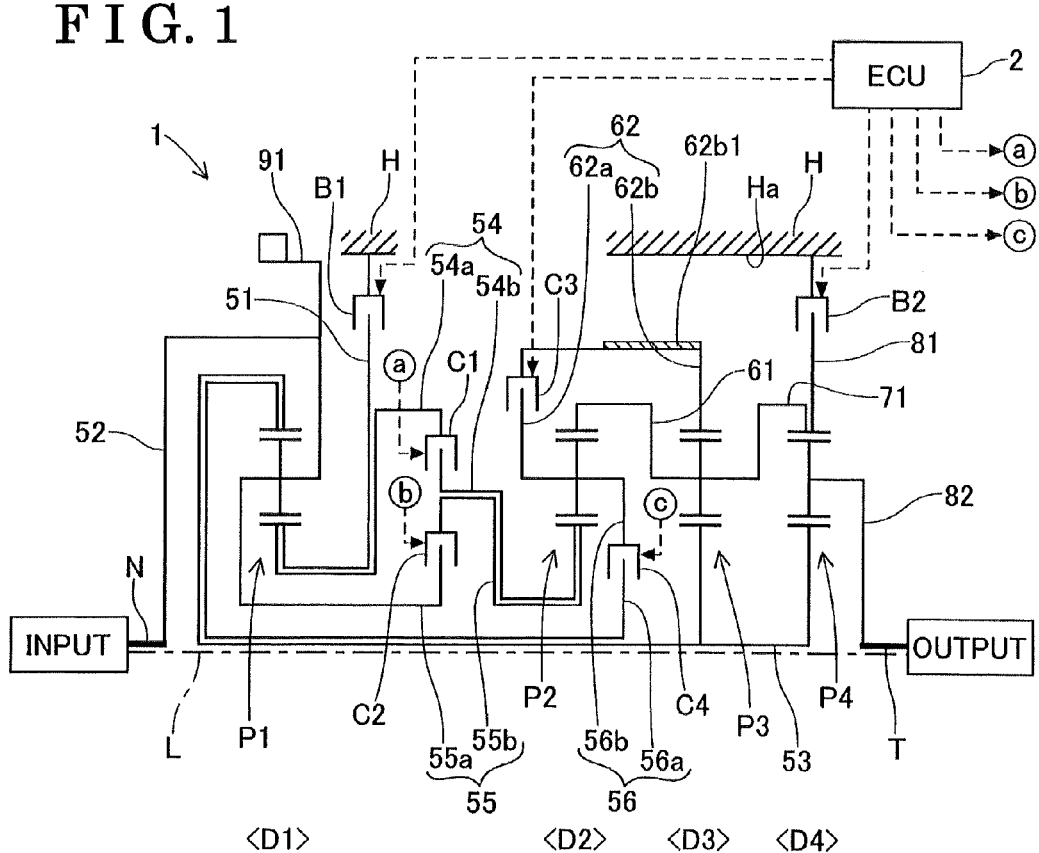
FIG. 1 is a schematic diagram showing an entire structure of a transmission according to a first embodiment.
FIG. 2 is a table for engagement showing operation states of clutches and brakes at each of speed stages.

Hereinafter, a first embodiment of a transmission of the present invention will be explained with reference to drawings. According to the embodiment, the transmission is applied as an apparatus for changing speeds of a rotational drive force that an engine mounted to a vehicle outputs. The vehicle is configured to move forward or to move backward with a predetermined speed stage that is established by the transmission where a rotational force whose speed is changed by the transmission is transmitted to driving wheels of the vehicle via a differential device that is not shown.

A construction of a transmission 1 will be explained with reference to FIG. 1. The transmission 1 includes four planetary mechanisms P1-P4 rotatably supported at a housing H to rotate about a rotation axis L, four clutches C1-C4 selectively connecting plural elements one another, two brakes B1, B2 braking rotations of predetermined elements, connection members 51-56, 61, 62, 71, 81, 82 connecting each element, an outside output member 91, an input shaft N, and an output shaft T. The input shaft N and the output shaft T are rotatably supported by the housing H to rotate about the rotation axis L.

According to the transmission 1, a control ECU 2 for the vehicle controls an operation state of engaging elements including each clutch C1-C4, and each brake B1, B2 on the basis of a control signal. According to the embodiment, by operating three engaging elements among the above described engaging elements, speed of a rotational drive force inputted from the input shaft N is changed to any one of ten forward speeds and one rearward speed to be outputted from the output shaft T. Details regarding operation states of the engaging elements and established speed stages in the transmission 1 will be described hereinafter.

Each planetary mechanism P1-P4 includes three elements, a sun gear, a ring gear, and a carrier. Here, in the transmission 1, four positions directed from an input side (left side in FIG. 1) where the input shaft N is arranged in a direction of the rotation axis L towards an output side (right side in FIG. 1) where the output shaft T is positioned are defined as first, second, third, and fourth positions D1-D4. The first planetary mechanism P1 is positioned at one of the first position D1 and the second position D2, and the second planetary mechanism P2 is positioned at the other of the first position D1 and the second position D2. According to the embodiment, as illustrated in FIG. 1, the first planetary mechanism P1 is positioned at the first position D1 and the second planetary mechanism P2 is positioned at the second position D2. Further, the third planetary mechanism P3 is positioned at the third position D3 and the fourth planetary mechanism P4 is positioned at the fourth position D4.

Further, for expressing three elements of the planetary mechanism, symbol "s" is added to symbols "P1, P2, P3, P4" for each planetary mechanism regarding the sun gear, symbol "r" is added to symbols "P1, P2, P3, P4" for each planetary mechanism regarding the ring gear, and symbol "c" is added to symbols "P1, P2, P3, P4" for each planetary mechanism regarding the carrier. That is, for the first planetary mechanism P1, three elements are expressed as the sun gear P1$s$, the ring gear P1$r$, and the carrier P1$c$. Three elements for the second, third, and fourth planetary mechanisms P2, P3, P4 are expressed in a similar manner.

Each clutch C1-C4 is an engaging element which is capable of selectively connecting plural elements one another. According to the embodiment, each clutch C1-C4 is normal open type clutch and an oil pressure type which is operated by the supplied oil pressure. For example, by the actuation of an oil pressure pump by the control ECU 2 on the basis of a control command, the oil pressure is supplied from the oil pressure pump to each clutch C1-C4 via an oil passage formed at the input shaft N and the housing H. Each clutch C1-C4 connects the elements each other by contacting plural clutch plates (not shown) one another by the supplied oil pressure so that the drive force is transmitted between the targeted elements one another. Upon blocking the supply of the oil pressure by the oil pressure pump, each clutch C1-C4 separates the clutch plates from one another and disengages the elements so that the drive force is not transmitted between the targeted elements. Positioning of each clutch C1-C4 will be described hereinafter.

Each brake B1, B2 is an engaging element provided at the housing H and for braking a rotation of a predetermined element. According to the embodiment, similarly to each clutch C1-C4, each brake B1, B2 is an oil pressure type brake that is actuated by the oil pressure supplied from an oil passage formed at the housing H. For example, by the actuation of the oil pressure pump by the control ECU 2 on the basis of the control command, the oil pressure is supplied to each brake B1, B2 from the oil pressure pump via the oil passage caught at the input shaft N and the housing H. Each brake B1, B2 brakes the rotation of the targeted predetermined element by pushing a pad (not shown) against a disc (not shown) by the supplied oil pressure. Then, each brake B1, B2 allows the rotation of the predetermined element by separating the pad from the disc when the supply of the oil pressure by the oil pressure pump is blocked.

The first brake B1 is connected to the sun gear P1$s$ of the first planetary mechanism P1 by a P1$s$B1 member 51 serving as a connection member. That is, the first brake B1 brakes the rotation of the sun gear P1$s$ of the first planetary mechanism P1 serving as a target of braking. The second brake B2 is connected to the ring gear P4$r$ of the fourth planetary mechanism P4 by means of a P4$r$B2 member 81 serving as a connection member. That is, the second brake B2 brakes the rotation of the ring gear P4$r$ of the fourth planetary mechanism P4 serving as a target of braking.

The input shaft N is a shaft member that inputs the rotational drive force of the engine of the vehicle to the transmission 1 via a clutch apparatus, for example. The input shaft N is always connected to the carrier P1$c$ of the first planetary mechanism P1 by a P1cN member 52 serving as a connection member (corresponding to a third connection member of the present invention). One end of the P1cN member 52 is connected to the carrier P1c from an output side (right side in FIG. 1) in the transmission 1. The other end of the P1cN member 52 is fixed to an outer periphery of the input shaft N.

The output shaft T is a shaft member positioned coaxially to the input shaft N and outputs the rotational drive force with changed speed to driving wheels via a differential device of the vehicle, for example. The output shaft T is always connected to the carrier P4c of the fourth planetary mechanism P4 by means of the P4cT member 82 serving as a connection member. One end of the P4cT member 82 is connected to the carrier P4c from the output side in the transmission 1. The other end of the P4cT member 82 is fixed to an outer periphery of the output shaft T.

Further, the ring gear P1r of the first planetary mechanism P1 is always connected to the sun gear P3s of the third planetary mechanism P3 and the sun gear P4s of the fourth planetary mechanism P4 by means of a P1rP3sP4s member 53 serving as a connection member. One end of the P1rP3sP4s member 53 is connected to an outer periphery side of the ring gear P1r. The other end of the P1rP3sP4s member 53 is connected to an inner periphery of each sun gear P3s, P4s. Accordingly, the ring gear P1r of the first planetary mechanism P1, the sun gears P3s, P4s of the third and fourth planetary mechanisms P3, P4 are configured to always integrally rotate.

The ring gear P2r of the second planetary mechanism P2 is always connected to the carrier P3c of the third planetary mechanism P3 by a P2rP3c member 61 (corresponding to a second connection member of the present invention) serving as a connection member. Further, the carrier P3c of the third planetary mechanism P3 is always connected to the ring gear P4r of the fourth planetary mechanism P4 by a P3cP4r member 71 serving as a connection member. By each connection member 61, 71, the ring gear P2r of the second planetary mechanism P2, the carrier P3c of the third planetary mechanism P3, and the ring gear P4r of the fourth planetary mechanism P4 are configured to always integrally rotate, and the rotation of the ring gear P2r of the second planetary mechanism P2, the carrier P3c of the third planetary mechanism P3, and the ring gear P4r of the fourth planetary mechanism P4 are braked simultaneously by the actuation of the second brake B2.

The first clutch C1 is arranged at the position for selectively connecting the sun gear P1s of the first planetary mechanism P1 and the sun gear P2s of the second planetary mechanism P2. A connection member P1sP2s member 54 connects elements between each of sun gears P1s, P2s one another. The first clutch C1 is provided at the connection member P1sP2s member 54. The P1sP2s member 54 is structured with a first connection part 54a and a second connection part 54b. One end of the first connection part 54a is connected to the sun gear P1s from an inner periphery of the sun gear P1s. The other end of the first connection part 54a is connected to the first clutch C1 from an outer periphery of the first clutch C1. The first connection part 54a is integrally formed with the P1sB1 member 51. On end of the second connection part 54b is connected to the first clutch C1 from an inner periphery of the first clutch C1. The other end of the second connection part 54b is connected to the sun gear P2s from an inner periphery of the sun gear P2s.

The second clutch C2 is arranged at the position for selectively connecting the carrier P1c of the first planetary mechanism P1 and the sun gear P2s of the second planetary mechanism P2. A connection member P1cP2s member 55 connects the elements between the carrier P1c and the sun gear P2s one another. The second clutch C2 is provided at the connection member P1cP2s member 55. The P1cP2s member 55 is structured with a third connection part 55a and a fourth connection part 55b. One end of the third connection part 55a is connected to the carrier P1c from the input side in the transmission 1. The other end of the third connection part 55a is connected to the second clutch C2 from an inner periphery side of the second clutch C2. One end of the fourth connection part 55b is connected to the second clutch C2 from an outer periphery side of the second clutch C2. The other end of the fourth connection part 55b is connected to the sun gear P2s from an inner periphery side of the sun gear P2s. The fourth connection part 55b is integrally formed with the second connection part 54b of the P1sP2s member 54.

The third clutch C3 is arranged at the position selectively connecting the carrier P2c of the second planetary mechanism P2 and the ring gear P3r of the third planetary mechanism P3. A connection member P2cP3r member 62 connects elements between the carrier P2c and the ring gear P3r. The third clutch C3 is provided at the connection member P2cP3r member 62. The connection member P2cP3r member 62 connects the elements of each of the planetary mechanisms P1-P4. The connection member P2cP3r member 62 corresponds to "a first connection member" of the present invention. The P2rP3c member 61 (second connection member) connects the ring gear P2r of the second planetary mechanism P2 and the carrier P3c of the third planetary mechanism P3. The P2cP3r member 62 is positioned at an outer periphery side relative to the P2rP3c member 61.

The P2cP3r member 62 is structured with a fifth connection portion 62a and a sixth connection part 62b. One end of the fifth connection part 62a connects to the carrier P2c from an input side in the transmission 1. The other end of the fifth connection part 62a is connected to the third clutch 3 from an inner periphery side of the third clutch 3. One end of the sixth connection part 62b is connected to the third clutch C3 from an outer periphery side of the third clutch C3. The other end of the sixth connection part 62b is connected to the ring gear P3r from an outer periphery side of the ring gear P3r. According to the embodiment, the sixth connection part 62b includes a cylindrical portion that extends in the direction of rotation axis L of the transmission 1. At the cylindrical portion of the sixth connection part 62b, an installation surface 62b1 (hatched portion in FIG. 1) that faces an inner periphery surface Ha of the housing H is formed. A third brake B3 for braking the rotation of the sixth connection part 62b can be additionally installed on the installation surface 62b1.

Thus, another member does not lie between the inner periphery surface Ha of the housing H and the sixth connection part 62b. Then, the sixth connection part 62b is always connected to the ring gear P3r of the third planetary mechanism P3. Accordingly, the sixth connection part 62b is configured not to be braked by the actuation of the first and second brakes B1, B2. By adopting these construction regarding the connection member, engagement patterns can be increased by the braking of the additionally installed brake in a case where the number of speed stages of the transmission is further increased by additionally installing a brake serving as an engaging element.

According to the embodiment, considering the additional installation of the brake in addition to the construction of the connection member described above regarding the sixth connection part 62b, the P2cP3r member 62 is positioned at the outer periphery side relative to the P2rP3c member 61. Because the P2rP3c member 61 and the P2cP3r member 62 include the same function for connecting the targeted element one another, alternatively, the P2rP3c member 61 may be positioned at the outer periphery side relative to the P2cP3r member 62. The detailed construction in which a brake is additionally installed will be described hereinafter.

The fourth clutch C4 is arranged at the position for selectively connecting the ring gear P1r of the first planetary mechanism P1 and the carrier P2c of the second planetary mechanism P2. A connection member P1rP2c member 56 connects elements between the ring gear P1r and the carrier P2c. The fourth clutch C4 is provided at the connection member P1rP2c member 56. The connection member P1rP2c member 56 is structured with a seventh connection part 56a and an eighth connection part 56b. One end of the seventh connection member 56a is connected to the ring gear P1r from an outer periphery side of the ring gear P1r. The other end of the seventh connection member 56a is connected to the fourth clutch C4 from an inner periphery side of the fourth clutch C4. The seventh connection part 56a is integrally formed with the P1rP3sP4s member 53. One end of the eighth connection member 56b is connected to the fourth clutch C4 from an outer periphery side of the fourth clutch C4. The other end of the eighth connection member 56b is connected to the carrier P1c from and output side of the transmission 1.

The outside output member 91 is always connected to the P1cN member 52 (third connection member) connecting the carrier P1c of the first planetary mechanism P1 and the input shaft N. The outside output member 91 is configured to output the rotational drive force inputted from the input shaft N to the outer periphery side of the transmission 1. Other than the rotational drive force with changed speeds, the transmission 1 may request an output of the rotational drive force to an accessory of a vehicle that is positioned at an outer periphery side of the housing, for example. In those circumstances, according to the layout of the embodiment, a member which is provided for the purpose of producing the rotational drive force may be positioned, for example, at the P3cP4r member 71 and the P1sP2s member 54 positioned at the outer periphery side within the housing H.

However, depending on the established speed stage, the rotation speed of the connection members 54, 71 may largely fluctuate compared to the rotation speed of the input shaft N, alternatively, the connection members 54, 71 may not rotate. Thus, it is not favorable to produce the rotational drive force from the connection members 54, 71. In light of the foregoing, according to the embodiment, the outside output member 91 is always connected to the P1cN member 52 that connects the input shaft N and the carrier P1c of the first planetary mechanism P1. Accordingly, the outside output member 91 enables to output the rotational drive force with the rotation speed which is constantly the same rotation speed of the input shaft N irrespective of whether the speed stage is established at the transmission and irrespective of the established speed stage.

Layouts of the first and second planetary mechanisms P1, P2 are not limited to the construction described above. For example, the first planetary mechanism P1 may be positioned at the second position D2 without changing the connected elements, and the second planetary mechanism P2 may be positioned at the first position D1 without changing the connected elements (see FIG. 8). Further, for example, the first planetary mechanism P1 may be positioned at the first position D1 as disclosed in the embodiment and the first brake B1 may be positioned at an input side of the transmission 1 relative to the first position D1 (see FIG. 7). By adopting the construction in which another member is not interposed between the inner periphery surface of the housing H and at least a portion of the P1cN member 52, the outside output member 91 can be connected to the P1cN member 52. Accordingly, by adopting the construction in which the first planetary mechanism P1 is positioned at the first position D1 and the first planetary mechanism P1 is positioned at an input side relative to the second planetary mechanism P2 and the first brake B1, the outside output member 91 can be provided at the transmission 1.

The operation of the transmission 1 constructed as described above will be explained with dereference to FIGS. 2 and 3. In the transmission 1, the control ECU 2 controls operation states of six engaging elements structured with each of clutches C1-C4 and each of brakes B1, B2. The transmission 1 establishes ten forward speeds ($1^{st}$, $2^{nd}$-$10^{th}$ in FIG. 2) and one rearward speed (Rev in FIG. 2) by selectively operating three engaging elements out of six engaging elements as shown in table for engagement in FIG. 2.

More specifically, in a case where the operation state of the engaging element is ON in the table for engagement in FIG. 2, a corresponding engaging element is indicated with a circle. That is, it is indicated that each clutch C1-C4 is in an operation state in which elements between target elements are connected. Further, it is indicated that each brake B1, B2 is in an operation state in which the rotation of the target element is braked. In a case where the operation state of the engaging element is OFF, a circle is not provided for the corresponding engaging element in the table for engagement in FIG. 2. Similarly, this is also applied even if a normal close type clutch is applied to each clutch C1-C4.

In the first speed state for the transmission 1, according to the table for engagement, the operation states of the first clutch C1, the fourth clutch C4, and the second brake B2 are ON. In those engagement state (engagement pattern), first, the sun gears P1s, P2s of the first and second planetary mechanism P1, P2 are connected by the first clutch C1, and a state where the sun gears P1s, P2s of the first and second planetary mechanisms P1, P2 are integrally rotated is established by the first clutch C1. Then, the carrier P2c of the second planetary mechanism P2 is connected to the P1rP3sP4s member 53 by the fourth clutch C4, and a state where the carrier P2c of the second planetary mechanism P2 is integrally rotated with the P1rP3sP4s member 53 is established.

In those circumstances, because the rotation of the ring gear P2r of the second planetary mechanism P2 is braked by the second brake B2, the speed of the rotational drive force inputted from the carrier P1c is reduced with a gear ratio in accordance with the number of teeth, and the rotational drive force with reduced speed is transmitted to the sun gear P4s of the fourth planetary mechanism P4 via the P1rP3sP4s member 53. Further, because the rotation of the ring gear P4r of the fourth planetary mechanism P4 is braked by the second brake B2, the speed of the rotational drive force inputted from the sun gear P4s is further reduced with a gear ratio in accordance with the number of teeth, and the rotational drive force with the reduced speed is transmitted to the output shaft T via the P4cT member 82.

In order to shift the transmission 1 from the first speed stage to the second stage, the engaging element actuated is switched from the fourth clutch C4 to the second clutch C2 while maintaining the operation state of the first clutch C1 and the second brake B2. In such engagement state, the sun gear P1s and the carrier P1c for the first planetary mechanism P1 is connected to the sun gear P2s for the second planetary mechanism P2 by the first and second clutches C1, C2 so that the sun gear P2s, the sun gear P1s, and the carrier P1c integrally rotate.

That is, when two elements among three elements are connected, the first planetary mechanism P1 is assumed to be a locked state where the planetary mechanism as a whole integrally rotates together with a remaining one element. According to the first planetary mechanism P1, a rotational drive force of the input shaft N inputted to the carrier P1c is transmitted to the sun gear P4s of the fourth planetary mechanism P4 via the P1rP3sP4s member 53. Then, because the rotation of the ring gear P4r of the fourth planetary mechanism P4 is braked by the second brake B2, speed of the rotational drive force inputted from the sun gear P4s is reduced with a gear ratio in accordance with the number of the teeth, and the rotational drive force with the reduced speed is transmitted to the output shaft T via the P4cT member 82.

Figure 3:
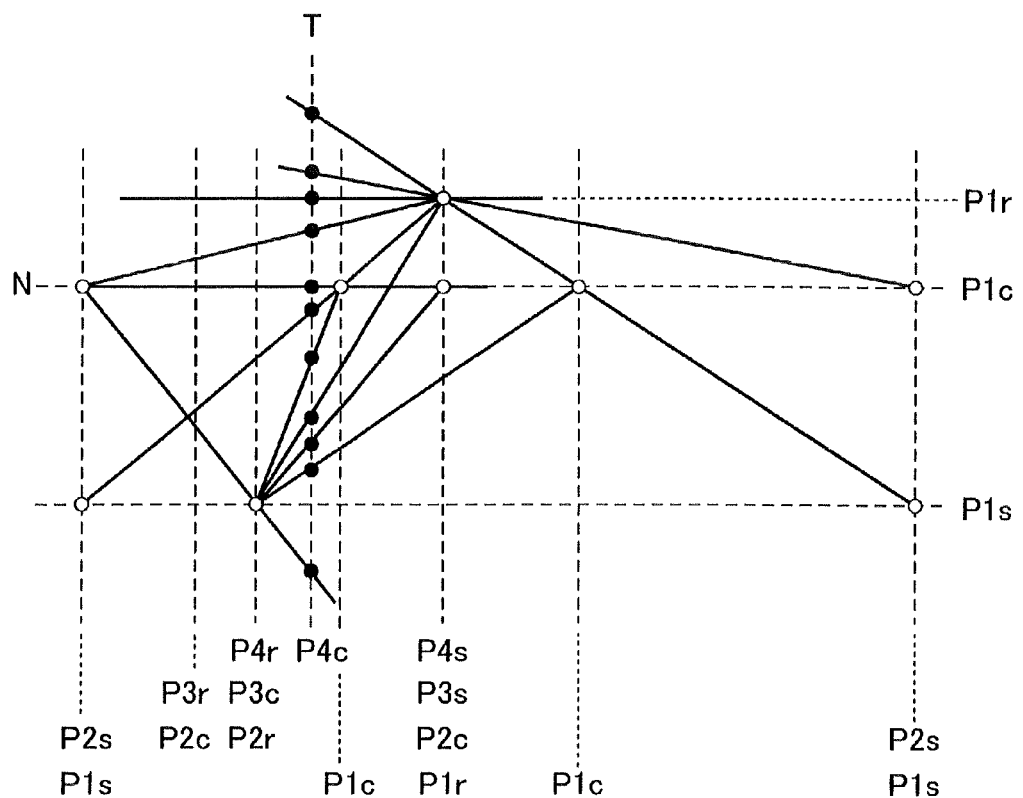
FIG. 3 is a velocity diagram showing a ratio of rotation speed of each element at each planetary mechanism.

In those circumstances, speed ratios for three elements of each planetary mechanism P1-P4 at each speed stage are shown with velocity diagram in FIG. 3. In the velocity diagram, each of elements for the third planetary mechanism P3 and the fourth planetary mechanism P4 is arranged in a transverse axis direction with a spacing (1:λ) corresponding to a gear ratio (λ), and speed ratios for each of the elements are provided in a vertical axis direction. Further, in FIG. 3, each element of the first and second planetary mechanisms P1, P2 is indicated in the transverse axis direction corresponding to each element of the third and fourth planetary mechanisms P3, P4. A portion is overlapped because the indicated position is changed depending on an operation state of each engaging element. Further, each element of the first and second planetary mechanisms P1, P2 corresponding to speed ratio indicated in the vertical axis direction is indicated at right-hand side in FIG. 3.

By selectively operating three engaging elements out of six engaging elements, as illustrated in the velocity diagram in FIG. 3, the transmission 1 can establish speed stages having different gear ratios from one another. Further, according to the transmission 1, the speed stage can be shifted to an adjacent speed stage by switching one of operated three engaging elements. Further, according to the layout of the transmission 1, in a case where the rotational drive force is inputted to the input shaft N, the drive force with the same rotation speed to the rotational drive force inputted to the input shaft N is outputted from the outside output member 91. The same is applied irrespective of a state where a predetermined speed stage is established at the transmission 1 and irrespective of a state where the transmission 1 operates none of the engaging element so that the rotational drive force is not outputted from the output shaft T.

Figure 4:
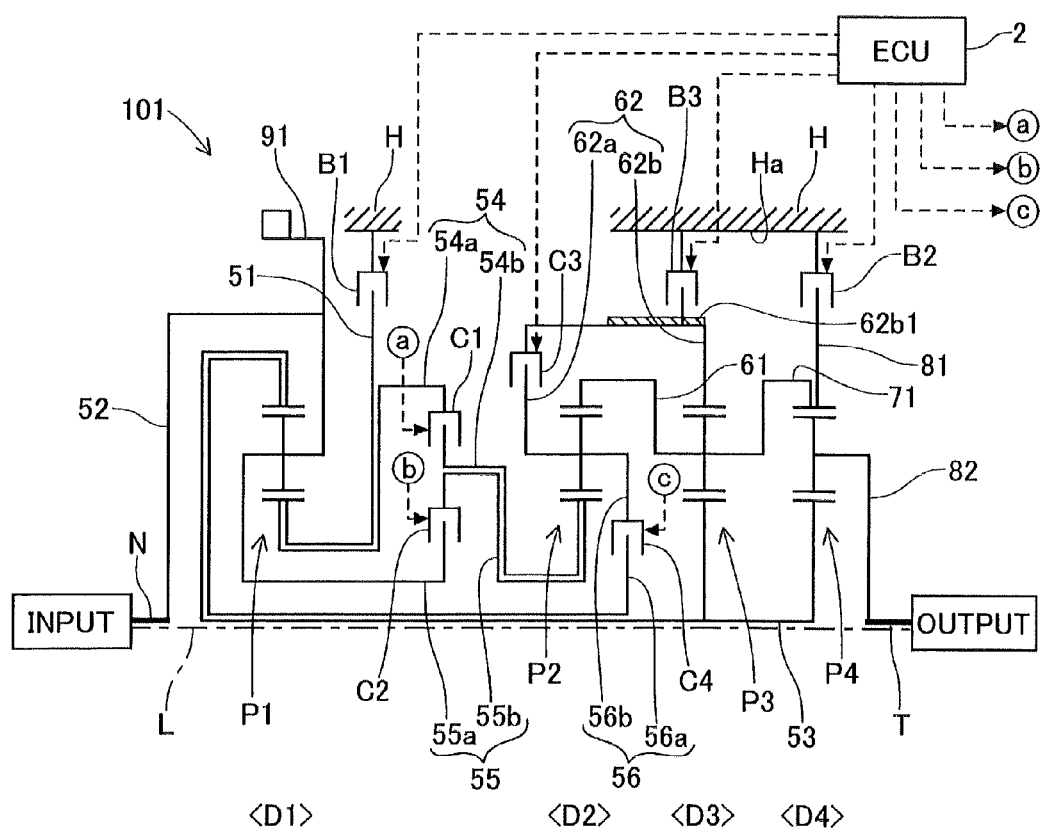
FIG. 4 is a schematic diagram in which an engaging element is added to the transmission shown in FIG. 1.

Next, a construction of a transmission 101 which is designed to further increase the number of speed stages by additionally providing a brake as an engaging element will be explained with reference to FIGS. 4 to 6. In addition to the above-described constructions, the transmission 101 further includes a third brake B3. The third brake B3 is additionally provided on an installation surface 62b1 at the sixth connection part 62b of the P2cP3r member 62. Here, the P2cP3r serves as a first connection member. The third brake B3 brakes the rotation of the ring gear P3r of the third planetary mechanism P3 via the sixth connection part 62b.

By forming the installation surface 62b1 of the P2cP3r member 62 in a manner being capable of coping with mounting the brake additionally, in a case where the third brake B3 is additionally provided, the third brake B3 can be readily mounted without changing layout arrangement and exchanging parts to other parts. Further, in case of additionally mounting the third brake B3, by using a housing exclusive for additionally mounting the engaging element, space for arranging the third brake B3 is ensured at the housing H and oil passage for supplying the oil pressure is formed at the housing H.

Further, the control ECU 2 for vehicle controls an operation state of the third brake B3 that is a target for control. Thus, according to the third brake B3, similarly to the first and second brakes B1, B2, for example, by the actuation of the oil pressure pump on the basis of a control command by the control ECU 2, the oil pressure is supplied. The third brake B3 brakes the rotation of the ring gear P3r of the third planetary mechanism P3 that is targeted, by pressing a pad (not shown) against a disc (not shown) by the supplied oil pressure. Then, when the supply of the oil pressure by the oil pressure pump is blocked, the third brake B3 separates the pad from the disc to allow the rotation of the ring gear P3r.

According to the transmission 101 to which the third brake B3 serving as the engaging element is provided, operation states of seven engaging elements constructed with each of clutches C1-C4, and each of brakes B1-B3 are controlled by the control ECU 2. Then, the transmission 101 establishes fifteen forward speeds ($1^{st}$, $2^{nd}$, - - - $15^{th}$ in FIG. 5) and two rearward speeds (Rev. 1, Rev. 2 in FIG. 5) by selectively actuating three engaging elements out of seven engaging elements as shown in table for engagement in FIG. 5.

In FIG. 5, for the purpose of comparing engagement patterns before and after additionally mounting the third brake B3, both of ten speed stages before adding the brake B3 (column indicated with $10^{th}$ at the top cell in FIG. 5) and fifteen speed stages after adding the brake B3 (column indicated with $15^{th}$ in the top cell in FIG. 5) are indicated. Further, the engagement patterns added by providing the third brake B3 correspond to rows with hatching background in FIG. 5. In the additionally provided engagement patterns, naturally, the third brake B3 is in an operated state.

Figure 6:
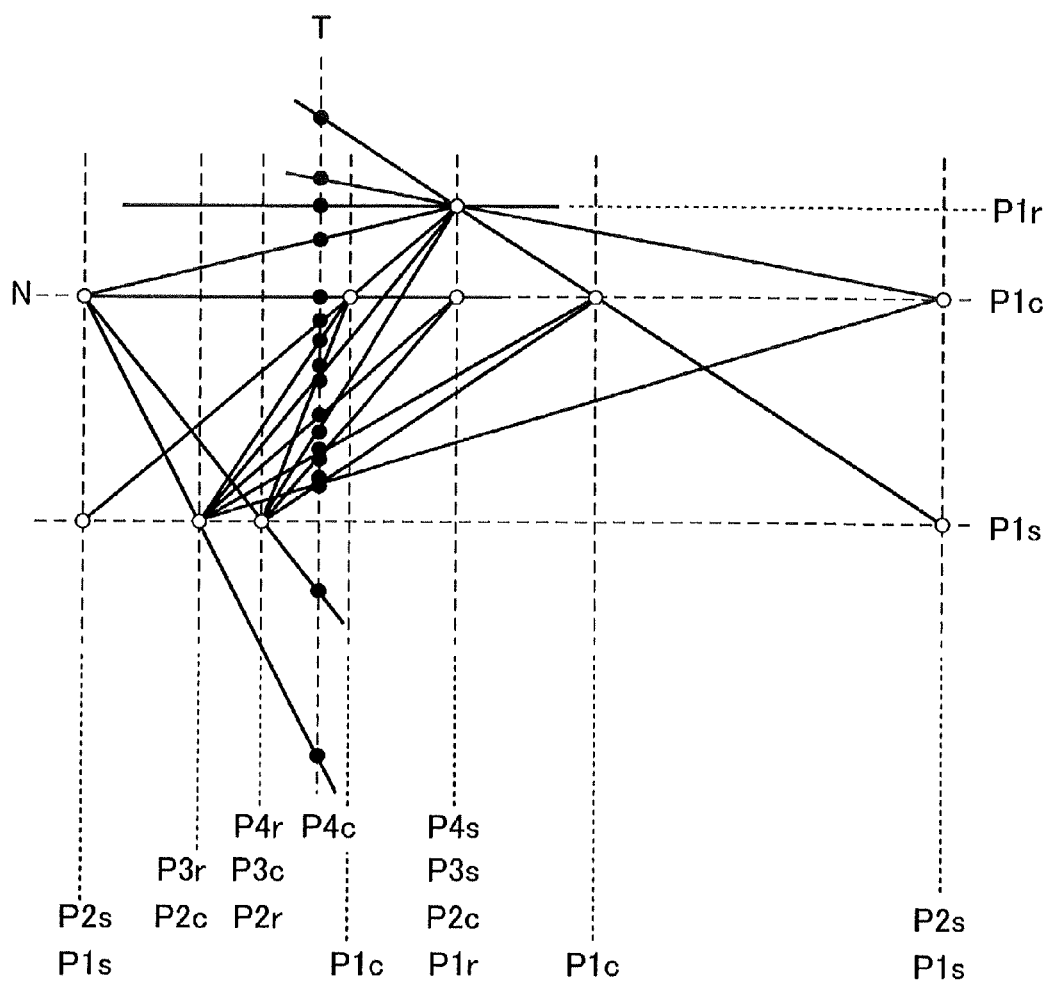
FIG. 6 is a velocity diagram showing a ratio of rotation speed of each element at each planetary mechanism.

Further, the speed ratio of three elements of each planetary mechanism P1-P4 at each speed stage is indicated with velocity diagram in FIG. 6. According to the velocity diagram, in a case where the ring gear P3r of the third planetary mechanism P3 is braked by the operation of the third brake B3 and the carrier P2c of the second planetary mechanism P2 is braked by the operation of the third clutch C3, engagement patterns that enables to establish greater number of speed stages can be increased compared to a table for engagement in FIG. 3.

Thus, the transmission 101 can establish speed stages having different gear ratios from one another, as shown in the velocity diagram in FIG. 6, by selectively operating three engaging elements among seven engaging elements. Further, according to the transmission 101, the speed stages can be shifted to an adjacent speed stage by switching one or two of three engaging elements in operation. That is, according to the transmission 101, the engaging elements up to two are allowed to be switched when shifting the speed stage to an adjacent speed stage.

Effects of the Construction of the Embodiment

According to the above-described transmission 1, by operating three engaging elements among fourth clutches C1-C4 and two brakes B1, B2, multiple speed stages with ten forward speeds and one rearward speed can be obtained. Further, at each forward speed stage, by switching one of three engaging elements in operation, the speed stage can be shifted to an adjacent speed stage. Accordingly, the transmission 1 can change speed in multiple stages with a layout described above and high controllability in application state can be ensured.

Further, the engagement patterns are increased by additionally providing the third brake B3 to the installation surface 62b1 formed on the P2cP3r (first connection member), and thus the number of the speed stages can be further increased. Further, in case of additionally providing the third brake B3, the third brake B3 can be provided without changing other members such as engaging elements and each of planetary mechanisms P1-P4. Thus, the transmission 1 before additionally providing the engaging element can establish multiple speed stages with a layout that is different from a known layout, and further enhances the expandability of the transmission.

Further, according to the construction in which the third brake B3 serving as an engaging element is additionally provided, the speed stages added by the added engagement patterns are five forward speed stages and one rearward speed stage. In those circumstances, the number of the engaging elements switched when shifting the speed stage to an adjacent speed stage is one or two at any speed stages. Thus, the transmission 101 to which the third brake B3 is additionally provided can ensure high controllability in the application state.

According to the embodiment, the transmission 1, 101 is constructed so that a portion of the P1cN member 52 transmitting the rotation of the input shaft N is positioned at an outer periphery side of the planetary mechanism, and a construction in which the outside output member 91 is provided at a portion of the P1cN member 52 is adopted. According to this construction, because the outside output member 91 can be integrally rotated with the input shaft N at any of the speed stages that the transmission 1, 101 establishes, the rotational drive force of the input shaft N can be outputted separately from the output shaft T.

First Modified Example

Figure 7:
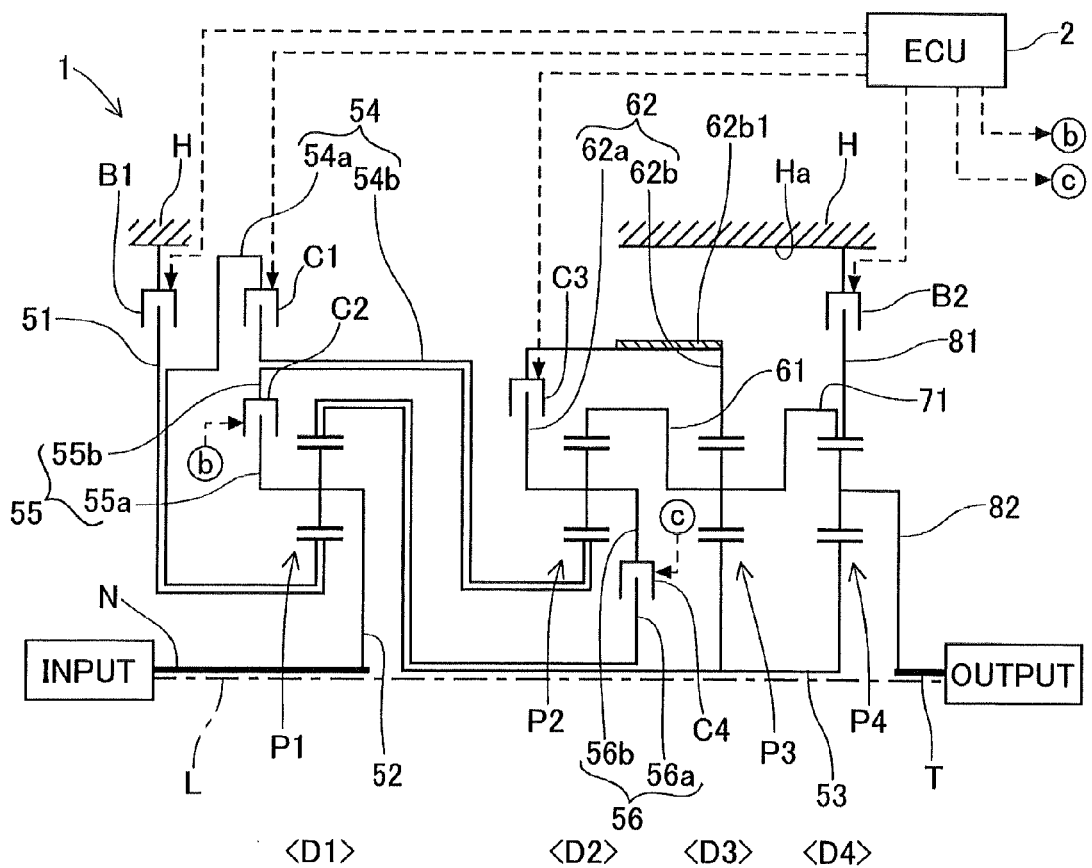
FIG. 7 is a schematic diagram showing an entire structure of a transmission according to a first modified mode.

According to the above-described embodiment, an example of the layout of the transmission 1, 101 is explained, however, the construction of the present invention is not limited to this and other layouts can be adopted. For example, as shown in FIG. 7, the first planetary mechanism P1 may be positioned at the first position D1 and the first brake B1 may be positioned at an input side of the transmission 1 relative to the first position D1. According to the foregoing construction, the connection member that always rotates with the same rotation speed with the input shaft N cannot be positioned at the outermost side without interposing another member, the outside output member 91 cannot be provided. However, according to such layout, configuration of each connection member including the P1cN member 52 can be simplified.

Second Modified Example

According to the above-described embodiment, the first planetary mechanism P1 of the transmission 1, 101 is positioned at the first position D1, and the second planetary mechanism P2 is positioned at the second position D2, however, the construction is not limited to this and can be made in another arrangement. For example, regarding the positional arrangement of the first and second planetary mechanisms P1, P2, the first planetary mechanism P1 may be positioned at the second position D2 and the second planetary mechanism P2 may be positioned at the first position D1 without changing the connected elements as described above.

Figure 8:
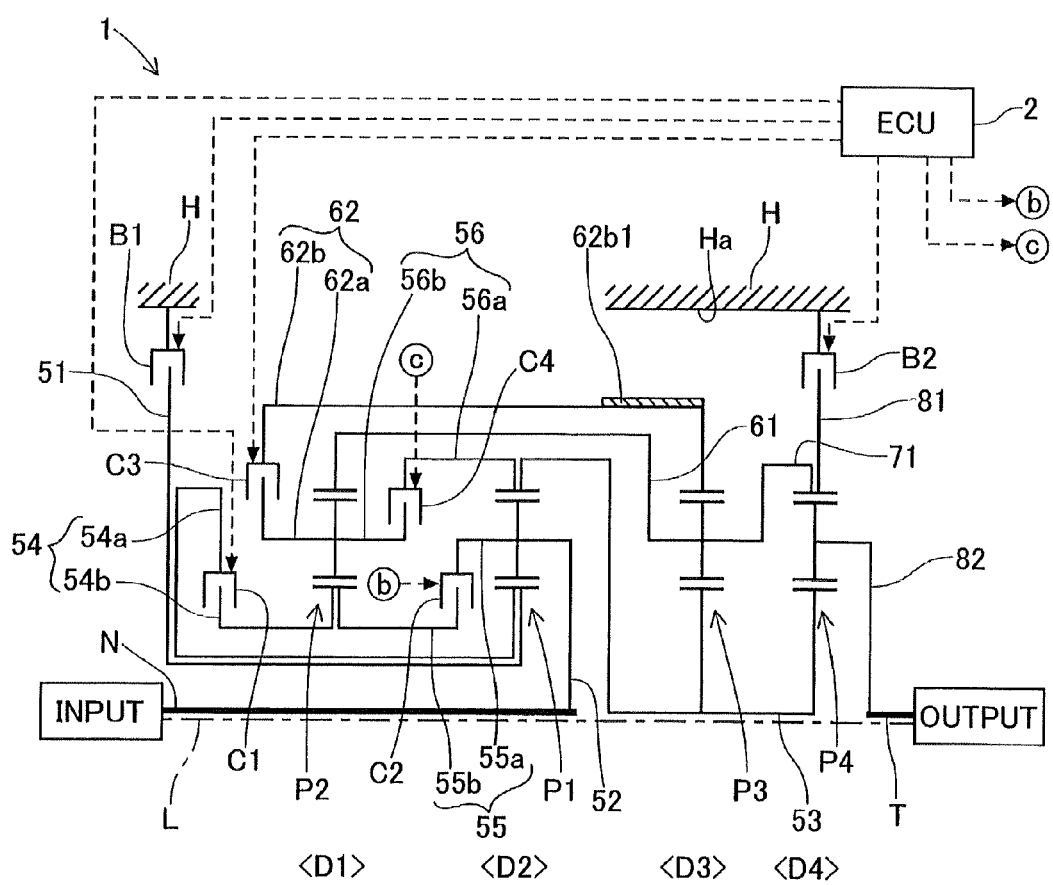
FIG. 8 is a schematic diagram showing an entire structure of a transmission according to a second modified mode.

More particularly, as shown in FIG. 8, a layout of each of planetary mechanisms P1-P4 of the transmission 1, 101 can be constructed. This layout can be constructed only by changing the position of a part of element, and further, can be constructed without changing any one of elements connected to each other. Further, according to this modified example, the sixth connection part 62b at which the installation surface 62b1 is formed in the P2cP3r member 62 (first connection member) extends within a space from the first position D1 to the third position D3 in an axial direction (axial space of the rotation axis). Thus, an axial length of the outer periphery surface of the sixth connection part 62b that is opposed to the inner periphery surface Ha of the housing H can be elongated. Accordingly, because an axial range in which the installation surface 62b1 is formed can be elongated, freedom for design with respect to the positioning of the installation surface 62b1 for additionally providing the third brake B3 can be enhanced.

As foregoing, the present invention is explained based on the embodiment, however, the present invention is not limited to the construction described in the embodiment, and can adopt various modes within a scope described in scope of claim.

The invention claimed is:

1. A transmission comprising:
a housing;
first, second, third and fourth planetary mechanisms rotatably supported by the housing to rotate about a rotation axis, the planetary mechanism including three elements, a sun gear, a ring gear, and a carrier;
first, second, third and fourth clutches capable of selectively connecting the elements one another;
a first brake braking a rotation of the sun gear of the first planetary mechanism;
a second brake braking a rotation of the ring gear of the fourth planetary mechanism;
a first connection member which serves as a connection member connecting the elements of the planetary mechanisms one another and to which the third clutch is positioned;
a second connection member serving as a connection member connecting the elements of the planetary mechanisms one another, the second connection member connecting the ring gear of the second planetary mechanism and the carrier of the third planetary mechanism;
an input shaft always connected to the carrier of the first planetary mechanism and rotatably supported by the housing to rotate about the rotation axis;
an output shaft always connected to the carrier of the fourth planetary mechanism and rotatably supported by the housing to rotate about the rotation axis; wherein
first, second, third and fourth positions are defined in an axial direction of the rotation axis from an input side where the input shaft is positioned towards an output side where the output shaft is positioned, the first planetary mechanism is positioned at one of the first position and the second position and the second planetary mechanism is positioned at the other of the first position and the second position, the third planetary mechanism is positioned at the third position, the fourth planetary mechanism is positioned at the fourth position;
the ring gear of the first planetary mechanism is always connected to the sun gear of the third planetary mechanism and the sun gear of the fourth planetary mechanism;
the ring gear of the second planetary mechanism is always connected to the carrier of the third planetary mechanism;
the carrier of the third planetary mechanism is always connected to the ring gear of the fourth planetary mechanism;
the first clutch is arranged at a position for selectively connecting the sun gear of the first planetary mechanism and the sun gear of the second planetary mechanism;

the second clutch is arranged at a position for selectively connecting the carrier of the first planetary mechanism and the sun gear of the second planetary mechanism;

the third clutch is arranged at a position for selectively connecting the carrier of the second planetary mechanism and ring gear of the third planetary mechanism;

the fourth clutch is arranged at a position for selectively connecting the ring gear of the first planetary mechanism and the carrier of the second planetary mechanism;

the first connection member is positioned at an outer periphery side compared to the second connection member; and an installation surface is formed at a connection part connecting the third clutch and the ring gear of the third planetary mechanism among the first connection member, the installation surface to which a third brake braking a rotation of the connection part is addable and which is opposed to an inner periphery surface of the housing.

2. The transmission according to claim 1, wherein the third brake is added to the installation surface of the first connection member and the third brake brakes a rotation of the ring gear of the third planetary mechanism via the connection part to which the installation surface is formed.

3. The transmission according to claim 1, comprising:

a third connection member serving as a connection member connecting the elements of the planetary mechanism one another and connecting the carrier of the first planetary mechanism and the input shaft;

the first planetary mechanism arranged at the first position and positioned at the input side compared to the first brake; and the third connection member is always connected to an outside output member which is capable of outputting a rotational drive force of the input shaft to an outer periphery side of the transmission.

4. The transmission according to claim 1, wherein the second planetary mechanism is arranged at the first position, and the connection part to which the installation surface is formed at the first connection member extends within a space from the first position to the third position in an axial direction.

* * * * *